J. MOREHEAD.
STEAM TRAP.
APPLICATION FILED OCT. 29, 1919.
1,352,617.
Patented Sept. 14, 1920.
4 SHEETS—SHEET 1.
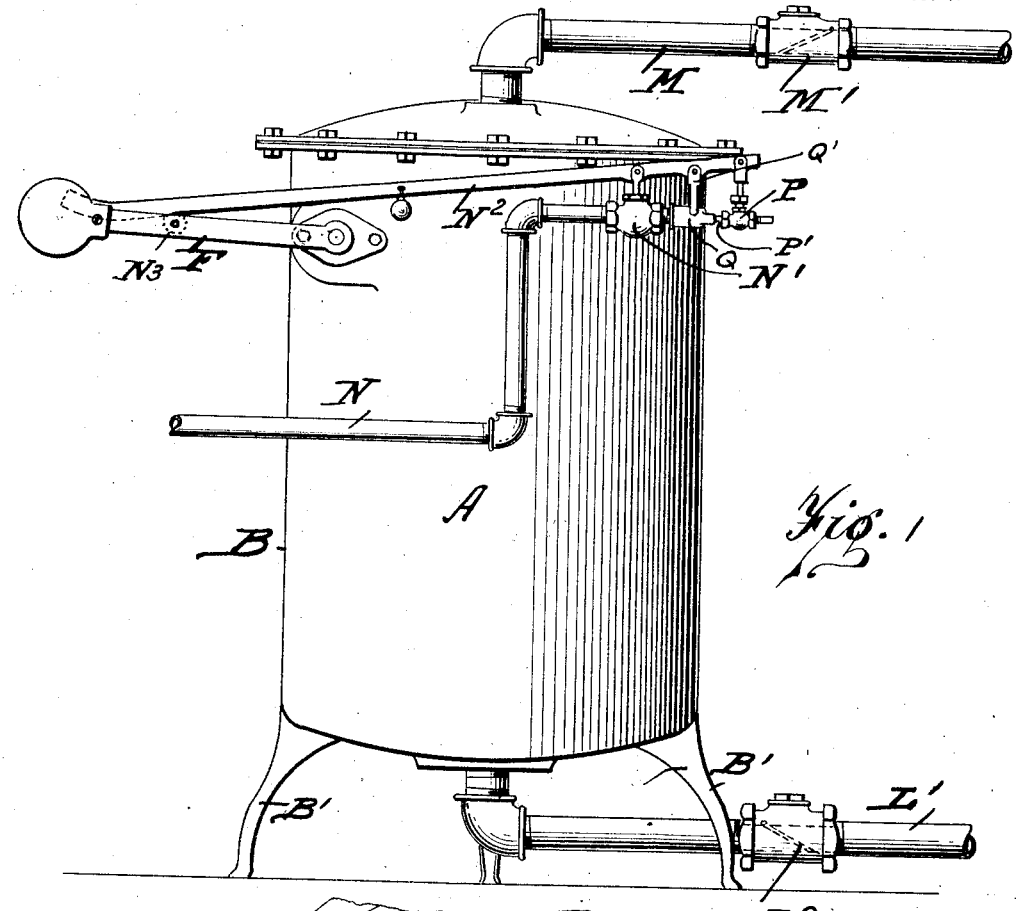
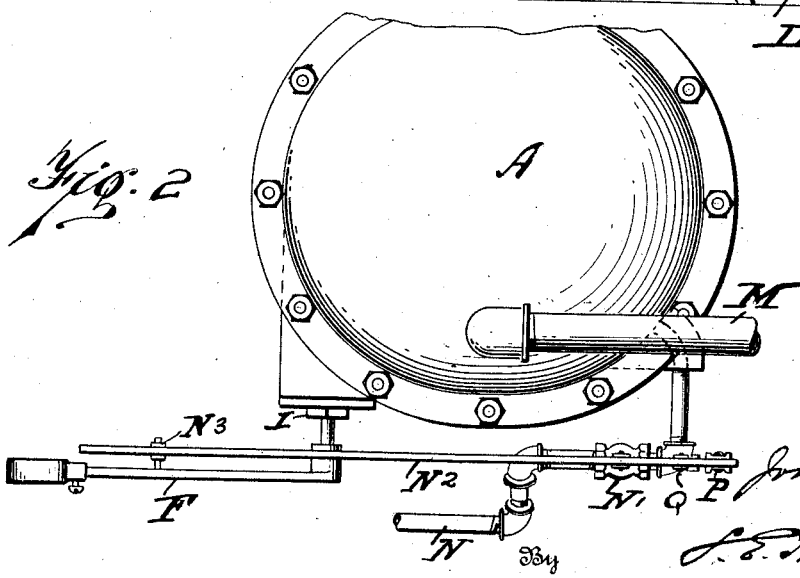

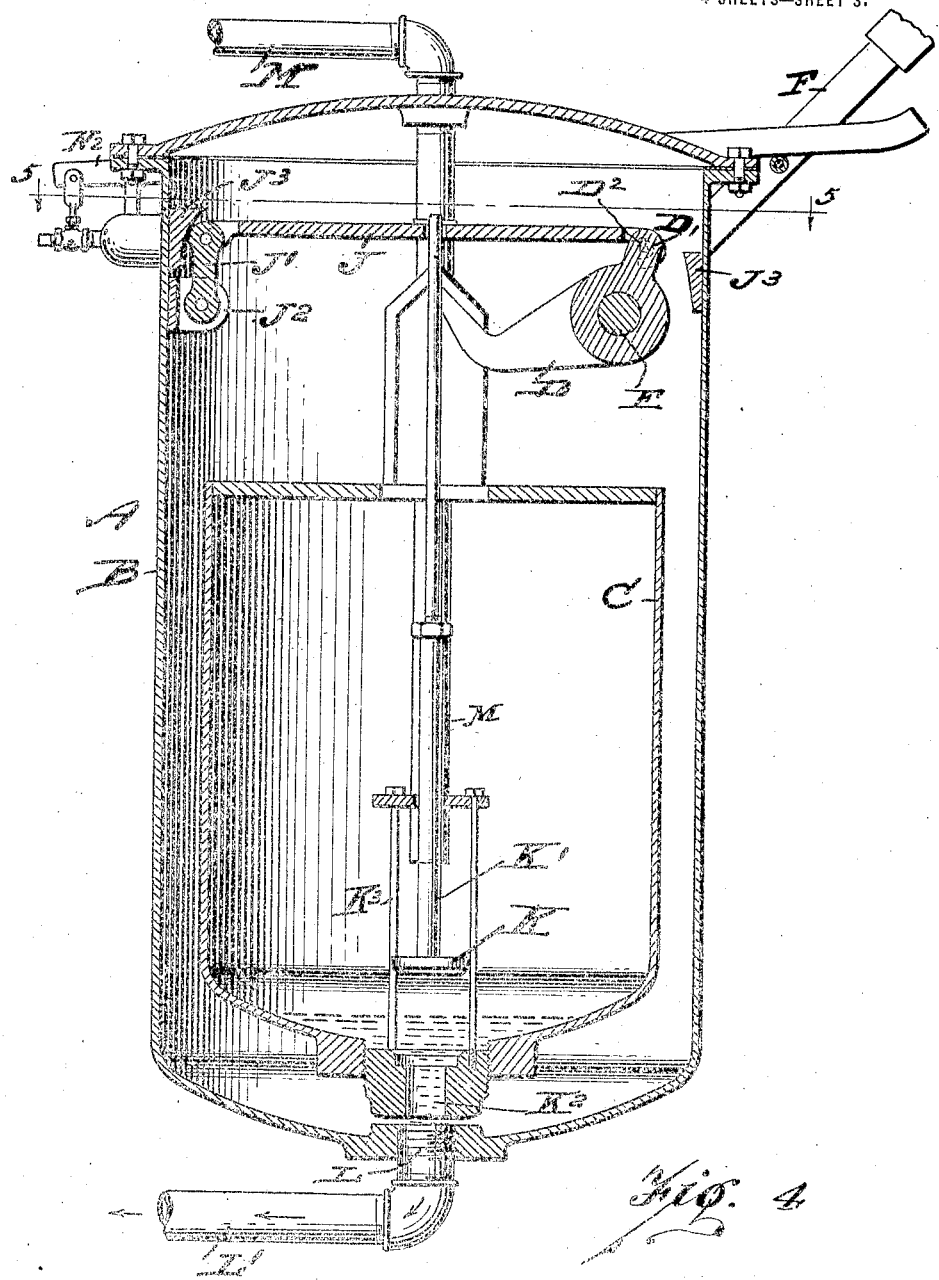

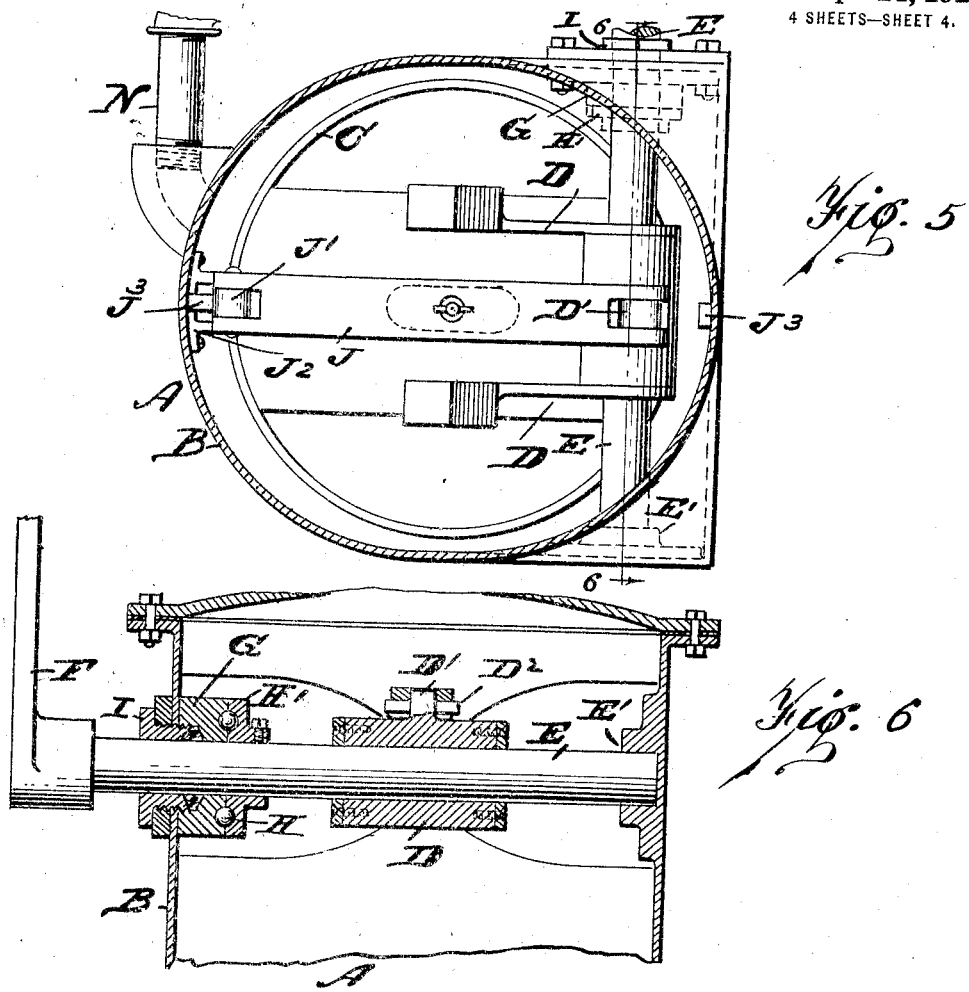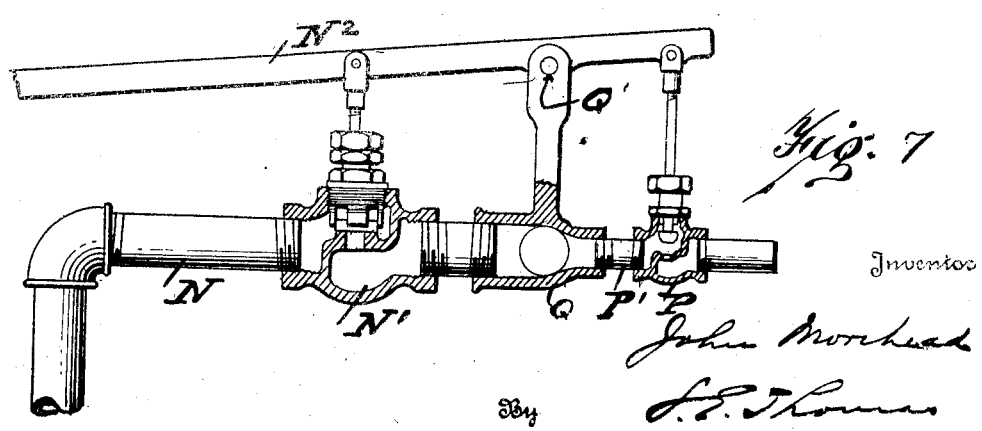

UNITED STATES PATENT OFFICE.

JOHN MOREHEAD, OF DETROIT, MICHIGAN.

STEAM-TRAP.

1,352,617.

Specification of Letters Patent.  Patented Sept. 14, 1920.

Application filed October 29, 1919. Serial No. 334,335.

*To all whom it may concern:*

Be it known that I, JOHN MOREHEAD, citizen of the United States, residing at Detroit, county of Wayne, State of Michigan, have invented a certain new and useful Improvement in Steam-Traps, and declare the following to be a full, clear, and exact description of the same, such as will enable others skilled in the art to which it pertains to make and use the same, reference being had to the accompanying drawings, which form a part of this specification.

My invention relates to steam traps shown in the accompanying drawings and more particularly described in the following specification and claims:—

One of the objects of the present invention is the elimination of the numerous packing glands or nuts made necessary in the usual type of tilting traps for the tubular trunnions, upon which the trap tilts, and through which the water of condensation and the steam from the boiler is delivered to and from the trap.

Another advantage of the present invention is that an upright stationary chamber is employed within which is lodged a vertically movable tank, in contradistinction to the usual horizontal tilting tank,—the steam when admitted to the surface of the water in the tank therefore has a relatively smaller area to cover and space in the tank to fill, thus the trap responds more rapidly to a balancing of pressure in the tank with that in the boiler.

Another feature of the invention consists in providing means whereby the valve in the vertically movable tank within the outer stationary chamber may be maintained in an elevated or "open position" when actuated, until substantially all of the water of condensation is discharged from the trap.

Another feature of the invention consists in so constructing the device that upon the vertically movable chamber filling with water of condensation to a predetermined level therein, the tank will descend thus opening a valve controlling the delivery of steam or boiler pressure to the tank, the leverage of the arm on which the tank is suspended gradually increasing as the tank descends thus insuring a positive movement and a full opening of said valve that boiler pressure may be quickly delivered to the trap and maintained therein until the water of condensation is sufficiently discharged therefrom to cause the weighted lever serving to maintain said vertically movable tank in the elevated position to again function to return the latter to its initial or elevated position.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:—

Figure 1 is a perspective view of the trap with pipe connections for the boiler and heating system,—not shown.

Fig. 2 is a plan view of the device with a portion broken away.

Fig. 4 is a similar sectional view showing the movable tank in its lower or discharging position, as when boiler pressure is delivered to the trap.

Fig. 5 is a horizontal cross-sectional view on or about line 5—5 of Fig. "4".

Fig. 6 is a fragmentary vertical cross-sectional view on line 6—6 of Fig. "5".

Fig. 7 is a detail side elevation, partly in section of the steam inlet and relief valves, pipe connections and the weighted lever for controlling the movement of said valves.

Figure 3:
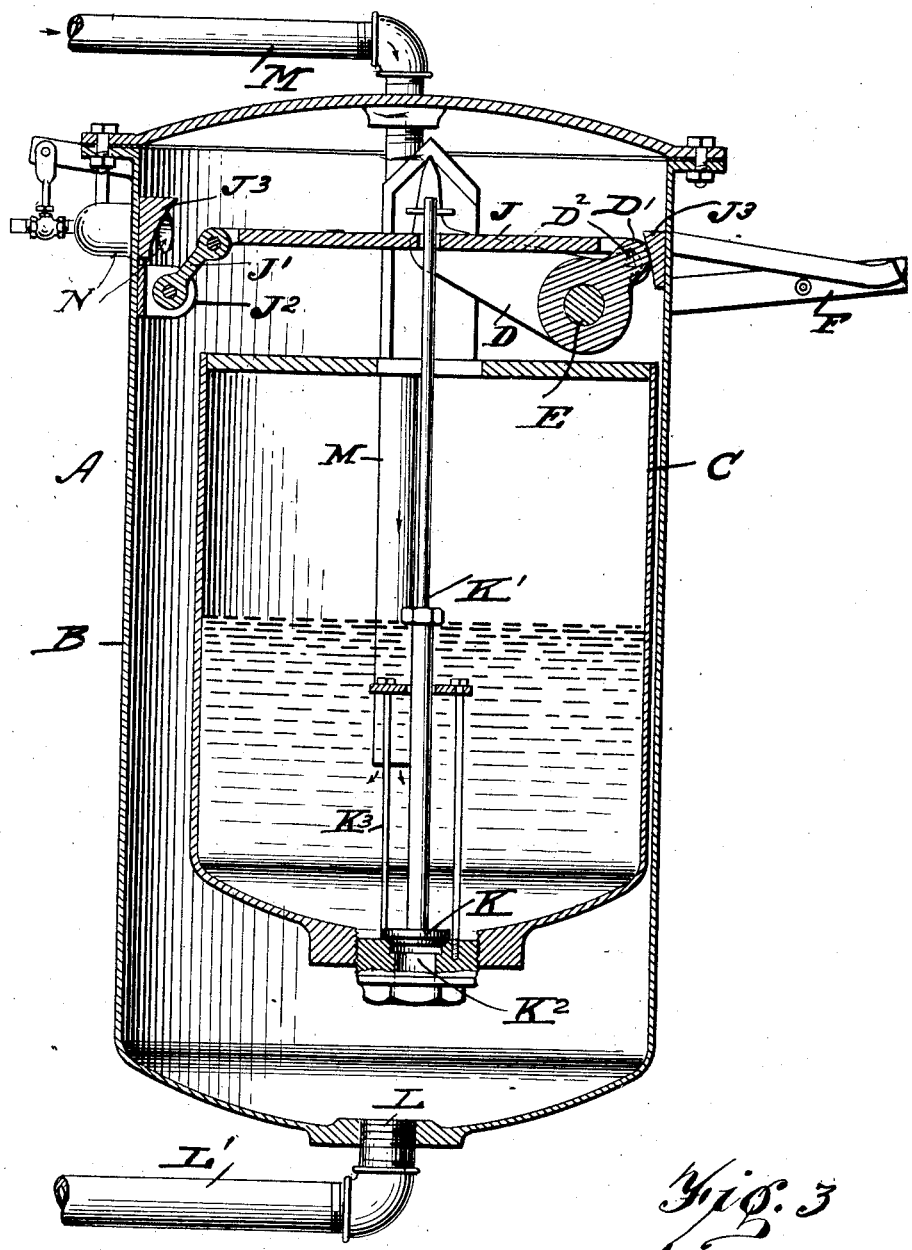
Fig. 3 is a vertical cross-sectional view of the trap showing the vertically movable tank within the outer chamber in its elevated, or filling position.

Referring now to the letters of reference placed upon the drawings:—

A, denotes the trap comprising a vertically supported stationary chamber B provided with legs B′ adapted to stand upon a suitable support placed at a sufficient altitude above the boiler to permit the water of condensation to flow into the boiler by gravity.

C, indicates a vertically movable tank suspended on a knife edge pivot on the end of the rocker arm D, in turn carried by a rock-shaft E, journaled at one end in a suitable bearing E′ within the stationary chamber B, the opposite end of the shaft extending through the wall of the chamber where it is provided with a weighted rocker arm or lever F. G is a journal bearing for the rock-shaft E, provided with a ball race to receive the balls H. H', indicates a thrust collar secured to the rock-shaft E, also grooved to receive the balls H. I, denotes a packing nut engaging the bearing G to insure a steam tight joint surrounding the projecting end of the rock-shaft. D' indicates a lug extending radially from the hub of the rocker arm D, supporting a knife edge bearing D². J, is a bar, having a hook-shaped end engaging the knife edge bearing D², extending transversely across the tank C, and pivotally connected by a link J' with a lug J² secured to the wall of the tank. J³, J³, are opposing buffers secured to the wall of the tank to receive the alternate impact of the bar J due to the movement of the rocker arm D. K, is a valve loosely suspended by a rod K' from the transverse bar J, controlling the discharge outlet K² through the bottom of the tank C. K³ is a cage surrounding the valve and a portion of the rod to assist in guiding the valve to its seat. L, indicates a discharge outlet from the chamber B which is relatively larger than the discharge outlet K² of the tank C to insure the full discharge of water from the tank C as rapidly as it is delivered therefrom. L' is a pipe connection leading to the boiler (not shown) in which is located a check valve L², designed to close against any returns from the boiler.

M, is a pipe leading from the heating system (not shown) for delivering the water of condensation to the tank C and M' is a check valve adapted to close against returns to the heating system.

N, is a pipe line leading from the steam space of the boiler to the trap above the predetermined water level in the latter. N' is a valve in the steam pipe line controlled by a weighted lever N² which in turn bears upon a roller pivoted to the weighted rocker arm or lever F, whereby, upon the latter being actuated, the valve N' will be opened to deliver boiler pressure to the trap.

P, indicates a relief valve in the pipe line P' connected by a fitting Q with the steam pipe line N, its stem P² engaging the end of the lever N². Q' is the fulcrum or pivotal support for the lever N², and is preferably integral with the fitting Q.

Having now indicated the several parts by reference letters the construction and operation of the device will be readily understood.

It will first be assumed that the tank C is in the position indicated in Fig. "3" of the drawings with the water of condensation free to enter the tank from the heating system through the pipe M;—the tank being supported in its elevated position by the weighted lever F, until the weight of the water in said tank overcomes the action of the weighted lever. The rocker-arm D from which the tank is suspended is thus caused to rock thereby actuating the transverse bar J in an upward and lateral direction thus lifting the valve K, loosely suspended from the transverse bar by its stem or rod K', from its seat thereby releasing the water from the tank as shown in Fig. "4".

Upon the tilting of the weighted lever F, the steam valve N' is simultaneously opened to admit boiler pressure to the body of the trap, the upward movement of the weighted lever F serving to lift the weighted lever N² controlling the action of said valve. Upon steam being admitted from the boiler to the trap the pressure in the latter is balanced with that in the boiler thereby permitting the water of condensation to flow by gravity from the trap to boiler. When a sufficient volume of water has been discharged from the trap the weighted lever F, again becomes operative to return the tank C to its initial position to again receive water of condensation from the heating system. The return of the weighted lever F to its initial position permits the weighted lever N², controlling the steam valve, to lower thereby shutting off boiler pressure to the trap and opening up the relief valve P thus releasing any pressure remaining in the trap which might otherwise prevent the free delivery of the water of condensation thereto.

It will be noted that upon the tank C filling with water of condensation sufficiently to overcome the action of the weighted lever F, which supports it in its elevated position, that the tank is caused to shift laterally within the stationary chamber B due to the downwardly swinging movement of the rocking arm D from which the tank is suspended from the position indicated in Fig. 3 to the position shown in Fig. 4. The leverage is thus automatically and gradually increased as the rocking arm changes its upwardly inclined position, shown in Fig. 3, to its downwardly inclined position shown in Fig. 4, thereby insuring a positive action of the several parts and causing the transverse bar J, from which the discharge valve K is suspended to lift the valve from its seat and maintain it in its elevated position until the tank is again returned to its initial position following the discharge of the water therefrom.

Having thus described my invention, what I claim is:

1. In a steam trap, a stationary chamber, a movable tank located within the stationary chamber, a rock-shaft journaled in the stationary chamber, a rock-arm secured to the rock-shaft from which the movable tank is suspended, means for conducting water of condensation to the movable tank, means for delivering steam or boiler pressure to the trap, a valve for controlling the delivery of steam to the tank, and means actuated through the movement of said tank whereby steam or boiler pressure may be admitted thereto.

2. In a steam trap, a stationary chamber, a movable tank housed within the stationary chamber, a rock-shaft journaled within the stationary chamber, a rock-arm secured to the rock-shaft having a knife-edge pivot from which the movable tank is suspended, pipe connections for delivering steam from a boiler to said trap, a valve for controlling the admission of steam through the pipe connections to the trap, a weighted lever for controlling said valve, a weighted arm carried by the rock-shaft adapted to actuate the weighted lever upon the movement of the tank.

3. A steam trap comprising a stationary chamber having a discharge outlet, means for delivering water of condensation to said trap, a rock-shaft journaled in the stationary chamber, an arm secured to the rock-shaft, a tank suspended from said arm within the stationary chamber having a discharge outlet, a valve for controlling delivery through the discharge outlet of said tank, a movable element from which said valve is suspended adapted to be raised by the tilting action of the rock-shaft, whereby the valve is lifted from its seat when the tank descends and seated when the tank is raised, means for controlling the delivery of steam to the trap adapted to be actuated through the movement of the tank, and means for releasing the steam pressure in said trap upon the return of the tank to its inital position.

4. In a steam trap, a stationary chamber provided with a discharge outlet, a tank having a substantially vertical movement located within the stationary chamber and also provided with a discharge outlet, a rock-shaft, a rock-arm carried by the rock-shaft from which the movable tank is suspended, a valve for controlling the discharge outlet of the movable tank, means actuated through the movement of the tank adapted to lift said valve from its seat and to maintain the valve off its seat until the tank has returned to its initial position, a steam valve for controlling the delivery of boiler pressure to said tank, means controlled by the movement of said tank adapted to open said steam valve for delivery of boiler pressure to the trap upon the movable tank being depressed and to close said valve when the movable tank is elevated, and means for releasing the boiler pressure from said trap when the valve is closed.

5. In a steam trap, a stationary chamber provided with a discharge outlet, a tank having a vertical movement within said chamber provided with a discharge orifice, a rock-shaft fitted with a rock-arm from which the tank is suspended, a bar connected at one end with the rock-shaft, a link connecting the opposite end of the bar with the stationary tank, whereby said bar will be shifted laterally and vertically upon the operation of the rock-shaft, a valve suspended from said bar for closing the discharge outlet from the tank, weighted means for normally maintaining said tank in an elevated position until overcome by the weight of water delivered to said trap, a valve for controlling the delivery of boiler pressure to said trap, means controlled by the movement of the tank adapted to open said valve for delivery of boiler pressure to the tank when the tank is depressed and to close said valve when the tank is elevated.

6. In a steam-trap, a stationary chamber having a rock-shaft journaled in the stationary chamber fitted with rock-arms having knife-edge pivot bearings, a tank having a discharge outlet suspended from the knife-edge pivot bearings of the rock-arm, a valve for controlling delivery through the discharge outlet of the tank, a weighted lever carried by the rock-shaft for supporting the tank in an elevated position until overcome by the weight of water delivered to the tank, a journal bearing through which the rock shaft extends, a thrust collar secured to the rock-shaft, and a ball-bearing between the thrust collar and the journal bearing.

In testimony whereof, I sign this specification in the presence of two witnesses.

JOHN MOREHEAD.

Witnesses:
S. E. THOMAS,
JOHN CONSIDINE, Jr.